United States Patent
Inomata et al.

(10) Patent No.: US 8,331,693 B2
(45) Date of Patent: Dec. 11, 2012

(54) INFORMATION ENCODING APPARATUS AND METHOD, INFORMATION RETRIEVAL APPARATUS AND METHOD, INFORMATION RETRIEVAL SYSTEM AND METHOD, AND PROGRAM

(75) Inventors: Seiichi Inomata, Tokyo (JP); Hideo Nakaya, Kanagawa (JP); Takashi Horishi, Tokyo (JP); Tsugihiko Haga, Tokyo (JP); Ryosuke Araki, Tokyo (JP); Takuro Kawai, Tokyo (JP); Toshiyuki Hino, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1038 days.

(21) Appl. No.: 12/212,345

(22) Filed: Sep. 17, 2008

(65) Prior Publication Data
US 2009/0110318 A1    Apr. 30, 2009

(30) Foreign Application Priority Data
Oct. 29, 2007   (JP) ................. 2007-281030

(51) Int. Cl.
*G06K 9/62*  (2006.01)
*G06K 9/68*  (2006.01)
*G06K 9/52*  (2006.01)
*G06K 9/38*  (2006.01)
*G06K 9/60*  (2006.01)

(52) U.S. Cl. ........ 382/218; 382/181; 382/220; 382/221; 382/222; 382/232; 382/239; 382/251; 382/305

(58) Field of Classification Search .................. 382/218, 382/181, 220, 221, 222, 232, 239, 251, 305
See application file for complete search history.

(56) References Cited

U.S. PATENT DOCUMENTS 5,444,487 A * 8/1995 Kondo et al. ............ 375/240.03
6,157,410 A * 12/2000 Izumi et al. .................. 348/445

(Continued)

FOREIGN PATENT DOCUMENTS

JP    8-237661    9/1996

(Continued)

OTHER PUBLICATIONS

Jiang, et al. "Direct Content Access and Extraction from JPEG Compressed Images." Pattern Recognition. 35. (2002): 2511-2519. Print.*

(Continued)

*Primary Examiner* — Michael A Newman
(74) *Attorney, Agent, or Firm* — Oblon, Spivak, McClelland, Maier & Neustadt, L.L.P.

(57) ABSTRACT

An information retrieval apparatus includes an obtaining unit configured to obtain dynamic ranges or re-quantization codes of a target object to be retrieved and dynamic ranges or re-quantization codes of each of comparison objects to be compared with the target object, the dynamic ranges or re-quantization codes of the target object and the dynamic ranges or re-quantization codes of the comparison objects being obtained as a result of adaptive dynamic range coding; a distance computation unit configured to compute distances between the target object and the comparison objects using the obtained dynamic ranges or re-quantization codes of the target object and the obtained dynamic ranges or re-quantization codes of the comparison objects; and a comparison unit configured to compare the distances between the target object and the comparison objects to select one of the comparison objects having a minimum distance.

15 Claims, 12 Drawing Sheets

U.S. PATENT DOCUMENTS

| | | | |
|---|---|---|---|
| 6,363,381 B1 * | 3/2002 | Lee et al. | 1/1 |
| 7,046,851 B2 * | 5/2006 | Keaton et al. | 382/218 |
| 7,236,636 B2 * | 6/2007 | Sakai et al. | 382/238 |
| 7,912,291 B2 * | 3/2011 | Berkner et al. | 382/190 |
| 2001/0017940 A1 * | 8/2001 | Kim et al. | 382/162 |
| 2005/0114306 A1 * | 5/2005 | Shu et al. | 707/3 |
| 2005/0162878 A1 * | 7/2005 | Koide et al. | 365/49 |
| 2006/0222249 A1 * | 10/2006 | Hosaka et al. | 382/235 |
| 2008/0056365 A1 * | 3/2008 | Igarashi | 375/240.13 |

FOREIGN PATENT DOCUMENTS

| | | |
|---|---|---|
| JP | 10-143524 | 5/1998 |
| JP | 2000-137820 | 5/2000 |
| JP | 2003-153275 | 5/2003 |
| JP | 2005-62964 | 3/2005 |

OTHER PUBLICATIONS

Feng, et al. "JPEG Compressed Image Retrieval via Statistical Features." Pattern Recognition. 36. (2003): 977-985. Print.*

Office Action issued Mar. 6, 2012 in Japanese Patent Application No. 2007-281030.

Office Action (with English translation) issued Jul. 24, 2012 in Japanese Patent Application No. 2007-281030 filed Oct. 29, 2007.

Mei Kodama, et al. "A Study on the Image Matching Methods in MSP Video Searching System" Technical Report of IEICE Dec. 17, 1999, vol. 99, No. 513, pp. 55-60.

* cited by examiner

INFORMATION ENCODING APPARATUS AND METHOD, INFORMATION RETRIEVAL APPARATUS AND METHOD, INFORMATION RETRIEVAL SYSTEM AND METHOD, AND PROGRAM

CROSS REFERENCES TO RELATED APPLICATIONS

The present invention contains subject matter related to Japanese Patent Application JP 2007-281030 filed in the Japanese Patent Office on Oct. 29, 2007, the entire contents of which are incorporated herein by reference.

BACKGROUND OF THE INVENTION

1. Field of the Invention

The present invention relates to an information encoding apparatus and method, an information retrieval apparatus and method, an information retrieval system and method, and a program. More specifically, the present invention relates to an information encoding apparatus and method, an information retrieval apparatus and method, an information retrieval system and method, and a program in which the amount of computation can be reduced to enable quick retrieval.

2. Description of the Related Art

With increased network bandwidth or increased storage capacity, techniques for efficiently organizing information, especially, image information, have been demanded.

For example, a technique in which tags are added to individual images and are retrieved has been proposed. However, the processing load involved in adding tags to a great number of images one by one is large to cause difficulty in quickly establishing a database.

A technique for detecting a feature value of an image to perform retrieval based on the feature value of the image has also been proposed.

For example, in Japanese Unexamined Patent Application Publication No. 2005-62964, image data recorded as a Joint Photographic Experts Group (JPEG) file is read and decompressed to obtain chromaticity information and luminance information for each block of eight by eight pixels in the decompression process, and it is determined whether or not the obtained chromaticity information or luminance information is within a range that meets the definition of an image to be retrieved. Thus, an image is retrieved.

SUMMARY OF THE INVENTION

Such a technique, however, involves high cost of computation, and it is difficult to efficiently retrieve a great number of images.

It is therefore desirable to reduce the amount of computation to enable quick retrieval.

According to an embodiment of the present invention, an information retrieval apparatus includes an obtaining unit configured to obtain dynamic ranges or re-quantization codes of a target object to be retrieved and dynamic ranges or re-quantization codes of each of comparison objects to be compared with the target object, the dynamic ranges or re-quantization codes of the target object and the dynamic ranges or re-quantization codes of the comparison objects being obtained as a result of adaptive dynamic range coding; a distance computation unit configured to compute distances between the target object and the comparison objects using the obtained dynamic ranges or re-quantization codes of the target object and the obtained dynamic ranges or re-quantization codes of the comparison objects; and a comparison unit configured to compare the distances between the target object and the comparison objects to select one of the comparison objects having a minimum distance.

The information retrieval apparatus can further include a decoding unit configured to decode the selected comparison object; and an output unit configured to output the decoded comparison object.

The distance computation unit can compute a distance between the target object and each of the comparison objects by calculating a sum of absolute values of differences between the dynamic ranges or re-quantization codes of the target object and dynamic ranges or re-quantization codes of each of the comparison objects or calculating a sum of squared values of differences between the dynamic ranges or re-quantization codes of the target object and dynamic ranges or re-quantization codes of each of the comparison objects.

The distance computation unit can compute a distance between the target object and each of the comparison objects by calculating a sum of exclusive ORs of most significant bits of the re-quantization codes of the target object and a sum of exclusive ORs of most significant bits of re-quantization codes of each of the comparison objects.

According to another embodiment of the present invention, an information retrieval method includes the steps of obtaining, using an obtaining unit, dynamic ranges or re-quantization codes of a target object to be retrieved and dynamic ranges or re-quantization codes of each of comparison objects to be compared with the target object, the dynamic ranges or re-quantization codes of the target object and the dynamic ranges or re-quantization codes of the comparison objects being obtained as a result of adaptive dynamic range coding; computing, using a distance computation unit, distances between the target object and the comparison objects using the obtained dynamic ranges or re-quantization codes of the target object and the obtained dynamic ranges or re-quantization codes of the comparison objects; and comparing, using a comparison unit, the distances between the target object and the comparison objects to select one of the comparison objects having a minimum distance.

According to still another embodiment of the present invention, a program causes a computer to execute a process including the steps of obtaining dynamic ranges or re-quantization codes of a target object to be retrieved and dynamic ranges or re-quantization codes of each of comparison objects to be compared with the target object, the dynamic ranges or re-quantization codes of the target object and the dynamic ranges or re-quantization codes of the comparison objects being obtained as a result of adaptive dynamic range coding; computing distances between the target object and the comparison objects using the obtained dynamic ranges or re-quantization codes of the target object and the obtained dynamic ranges or re-quantization codes of the comparison objects; and comparing the distances between the target object and the comparison objects to select one of the comparison objects having a minimum distance.

According to still another embodiment of the present invention, an information encoding apparatus includes an input unit configured to receive an input target object to be retrieved and an input comparison object to be compared with the input target object during retrieval; an encoding unit configured to encode the input comparison object using adaptive dynamic range coding; and a storage unit configured to store re-quantization codes of the comparison object obtained as a result of the adaptive dynamic range coding, together with dynamic ranges of the comparison object, so that the re-quantization codes of the comparison object can be read during retrieval.

According to still another embodiment of the present invention, an information encoding method includes the steps of receiving, using an input unit, an input target object to be retrieved and an input comparison object to be compared with the input target object during retrieval; encoding, using an encoding unit, the input comparison object using adaptive dynamic range coding; and storing, using a storage unit, re-quantization codes of the comparison object obtained as a result of the adaptive dynamic range coding, together with dynamic ranges of the comparison object, so that the re-quantization codes of the comparison object can be read during retrieval.

According to still another embodiment of the present invention, a program causes a computer to execute a process including the steps of receiving an input target object to be retrieved and an input comparison object to be compared with the input target object during retrieval; encoding the input comparison object using adaptive dynamic range coding; and storing re-quantization codes of the comparison object obtained as a result of the adaptive dynamic range coding, together with dynamic ranges of the comparison object, so that the re-quantization codes of the comparison object can be read during retrieval.

According to still another embodiment of the present invention, an information retrieval system includes an input unit configured to receive input information; an encoding unit configured to encode the input information using adaptive dynamic range coding; an obtaining unit configured to obtain dynamic ranges or re-quantization codes of a target object to be retrieved and dynamic ranges or re-quantization codes of each of comparison objects to be compared with the target object, the dynamic ranges or re-quantization codes of the target object and the dynamic ranges or re-quantization codes of the comparison objects being obtained as a result of the adaptive dynamic range coding; a distance computation unit configured to compute distances between the target object and the comparison objects using the obtained dynamic ranges or re-quantization codes of the target object and the obtained dynamic ranges or re-quantization codes of the comparison objects; and a comparison unit configured to compare the distances between the target object and the comparison objects to select one of the comparison objects having a minimum distance.

According to still another embodiment of the present invention, an information retrieval method includes the steps of receiving, using an input unit, input information; encoding, using an encoding unit, the input information using adaptive dynamic range coding; obtaining, using an obtaining unit, dynamic ranges or re-quantization codes of a target object to be retrieved and dynamic ranges or re-quantization codes of each of comparison objects to be compared with the target object, the dynamic ranges or re-quantization codes of the target object and the dynamic ranges or re-quantization codes of the comparison objects being obtained as a result of the adaptive dynamic range coding; computing, using a distance computation unit, distances between the target object and the comparison objects using the obtained dynamic ranges or re-quantization codes of the target object and the obtained dynamic ranges or re-quantization codes of the comparison objects; and comparing, using a comparison unit, the distances between the target object and the comparison objects to select one of the comparison objects having a minimum distance.

According to still another embodiment of the present invention, a program causes a computer to execute a process including the steps of receiving input information; encoding the input information using adaptive dynamic range coding; obtaining dynamic ranges or re-quantization codes of a target object to be retrieved and dynamic ranges or re-quantization codes of each of comparison objects to be compared with the target object, the dynamic ranges or re-quantization codes of the target object and the dynamic ranges or re-quantization codes of the comparison objects being obtained as a result of the adaptive dynamic range coding; computing distances between the target object and the comparison objects using the obtained dynamic ranges or re-quantization codes of the target object and the obtained dynamic ranges or re-quantization codes of the comparison objects; and comparing the distances between the target object and the comparison objects to select one of the comparison objects having a minimum distance.

According to an embodiment of the present invention, dynamic ranges or re-quantization codes of a target object to be retrieved and dynamic ranges or re-quantization codes of each of comparison objects to be compared with the target object are obtained as a result of adaptive dynamic range coding; distances between the target object and the comparison objects are computed using the obtained dynamic ranges or re-quantization codes of the target object and the obtained dynamic ranges or re-quantization codes of the comparison objects; and the distances between the target object and the comparison objects are compared to select one of the comparison objects having a minimum distance.

According to another embodiment of the present invention, an input target object to be retrieved and an input comparison object to be compared with the input target object during retrieval are received; the input comparison object is encoded using adaptive dynamic range coding; and re-quantization codes of the comparison object obtained as a result of the adaptive dynamic range coding are stored together with dynamic ranges of the comparison object so that the re-quantization codes of the comparison object can be read during retrieval.

According to still another embodiment of the present invention, input information is received; the input information is encoded using adaptive dynamic range coding; dynamic ranges or re-quantization codes of a target object to be retrieved and dynamic ranges or re-quantization codes of each of comparison objects to be compared with the target object are obtained as a result of the adaptive dynamic range coding; distances between the target object and the comparison objects are computed using the obtained dynamic ranges or re-quantization codes of the target object and the obtained dynamic ranges or re-quantization codes of the comparison objects; and the distances between the target object and the comparison objects are compared to select one of the comparison objects having a minimum distance.

According to an embodiment of the present invention, therefore, the amount of computation during retrieval can be reduced to enable quick retrieval.

DESCRIPTION OF THE PREFERRED EMBODIMENTS

An embodiment of the present invention will be described hereinafter with reference to the drawings.

Figure 1:
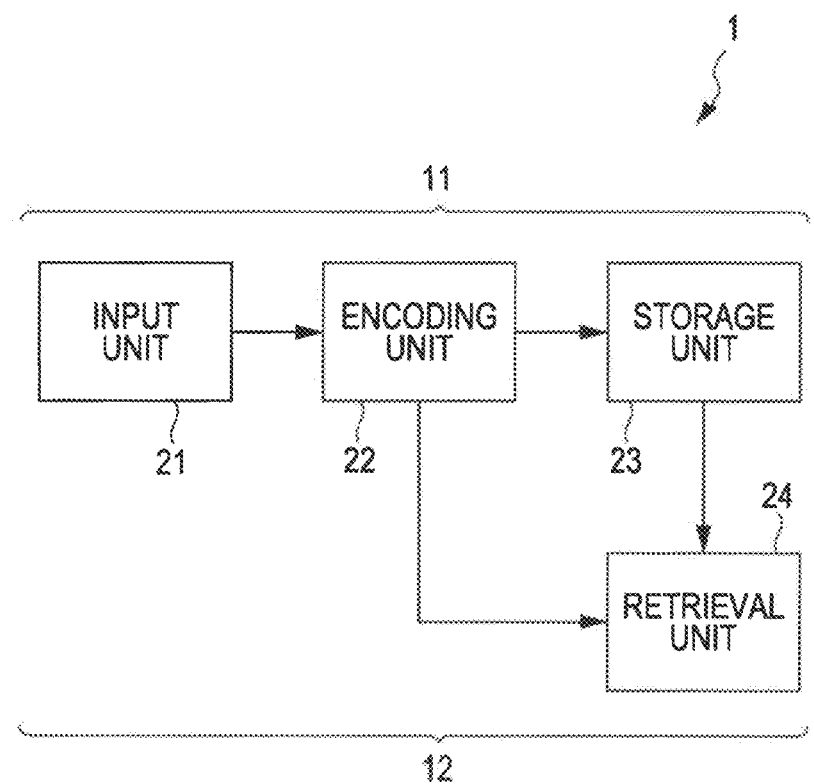
FIG. 1 is a block diagram showing a structure of an information retrieval system according to an embodiment of the present invention.

FIG. 1 shows an information retrieval system 1 according to an embodiment of the present invention. The information retrieval system 1 includes an information encoding apparatus 11 and an information retrieval apparatus 12.

The information encoding apparatus 11 includes an input unit 21, an encoding unit 22, and a storage unit 23. The information retrieval apparatus 12 includes the input unit 21, the encoding unit 22, the storage unit 23, and a retrieval unit 24.

The input unit 21 receives input information to be stored in the storage unit 23 or a target object to be retrieved through a recording medium, a network such as the Internet, or any other suitable medium, which is not shown in FIG. 1. In this embodiment, image information is input. The encoding unit 22 encodes the input information using adaptive dynamic range coding (ADRC). The storage unit 23 stores the encoded information. The retrieval unit 24 retrieves information similar to (or the same information as) information of a target object to be retrieved from information of comparison objects stored in the storage unit 23.

Figure 2:
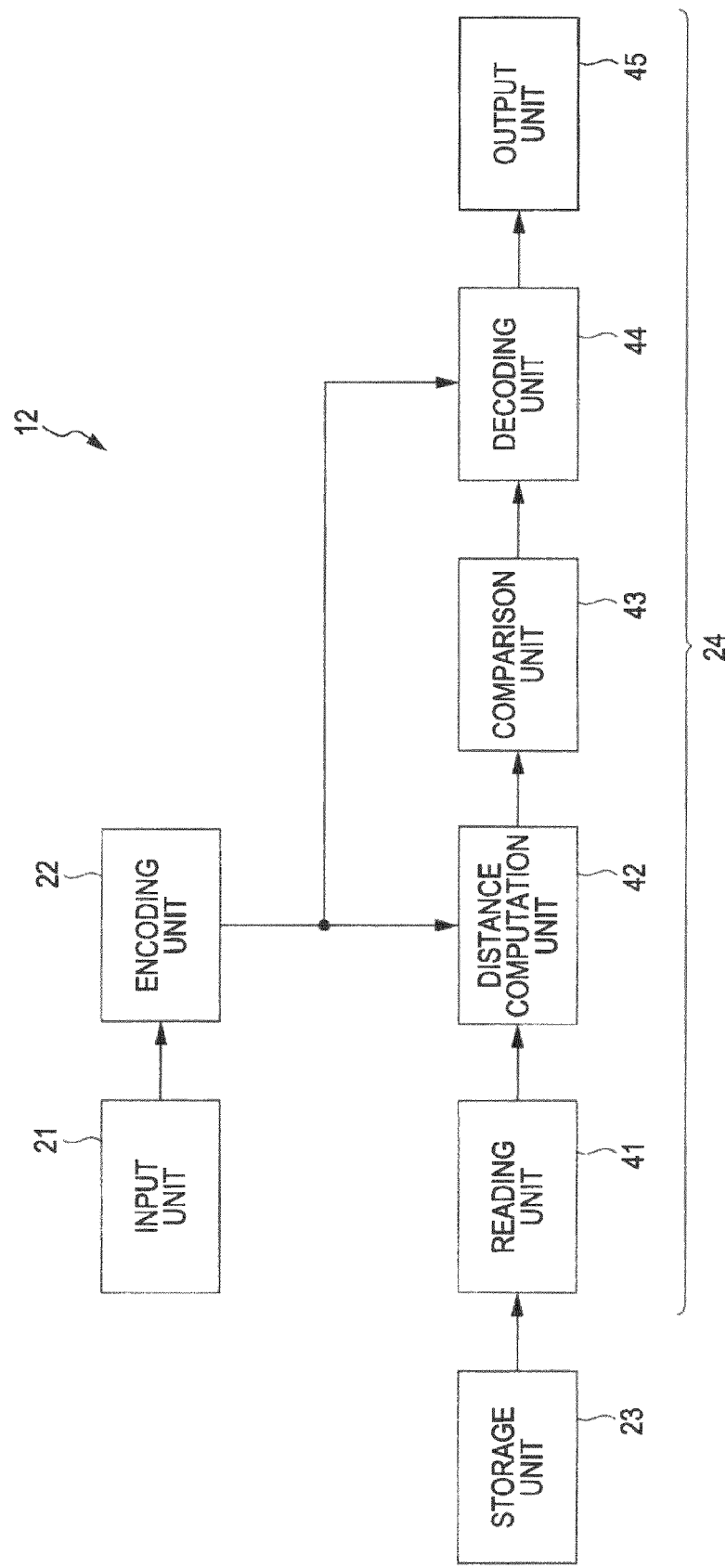
FIG. 2 is a block diagram showing a structure of an information retrieval apparatus according to an embodiment of the present invention.

FIG. 2 shows an example structure of the retrieval unit 24 of the information retrieval apparatus 12 according to an embodiment of the present invention. The retrieval unit 24 includes a reading unit 41, a distance computation unit 42, a comparison unit 43, a decoding unit 44, and an output unit 45.

The reading unit 41 reads the information of the comparison objects stored in the storage unit 23. The distance computation unit 42 computes a distance between each of the comparison objects read by the reading unit 41 and the target object input from the input unit 21 and encoded by the encoding unit 22 using ADRC. The comparison unit 43 compares the distances between the target object and the individual objects, and selects a comparison object having a small distance. The decoding unit 44 decodes the target object and the comparison object determined to be similar to the target object as a result of the comparison using a decoding method corresponding to the encoding method used in the encoding unit 22. The output unit 45, which is implemented by, for example, a liquid crystal display (LCD), speakers, or any other suitable device, outputs the retrieved and decoded information.

Figure 3:
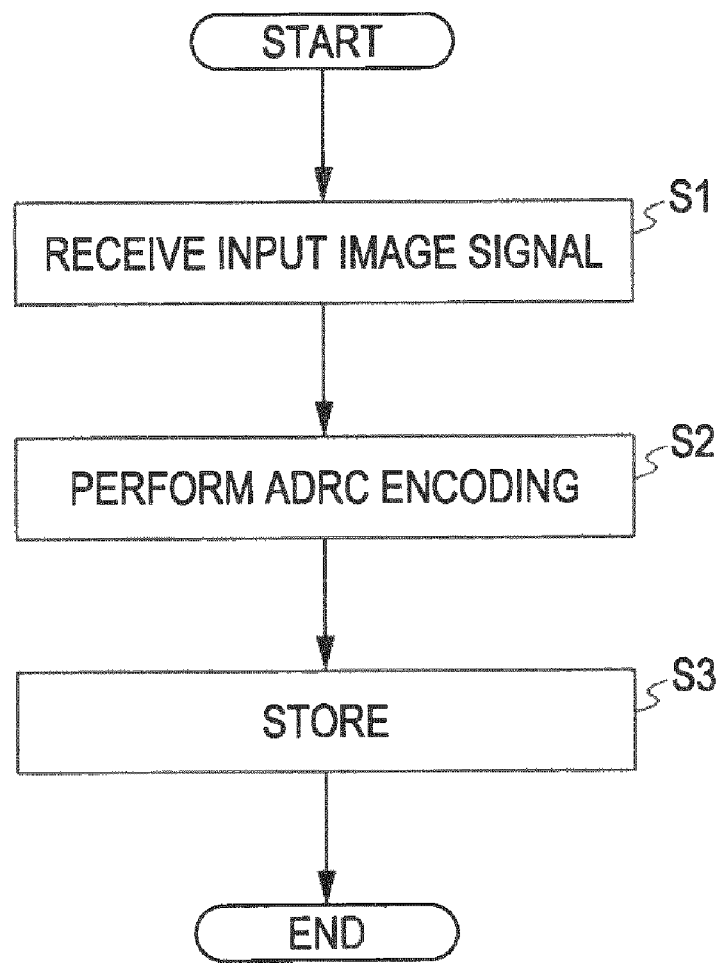
FIG. 3 is a flowchart showing an encoding process.

Next, an encoding process performed by the information encoding apparatus 11 will be described with reference to a flowchart of FIG. 3.

In step S1, the input unit 21 receives an input image signal to be stored in the storage unit 23. In step S2, the encoding unit 22 encodes the input image signal using ADRC.

Figure 4:
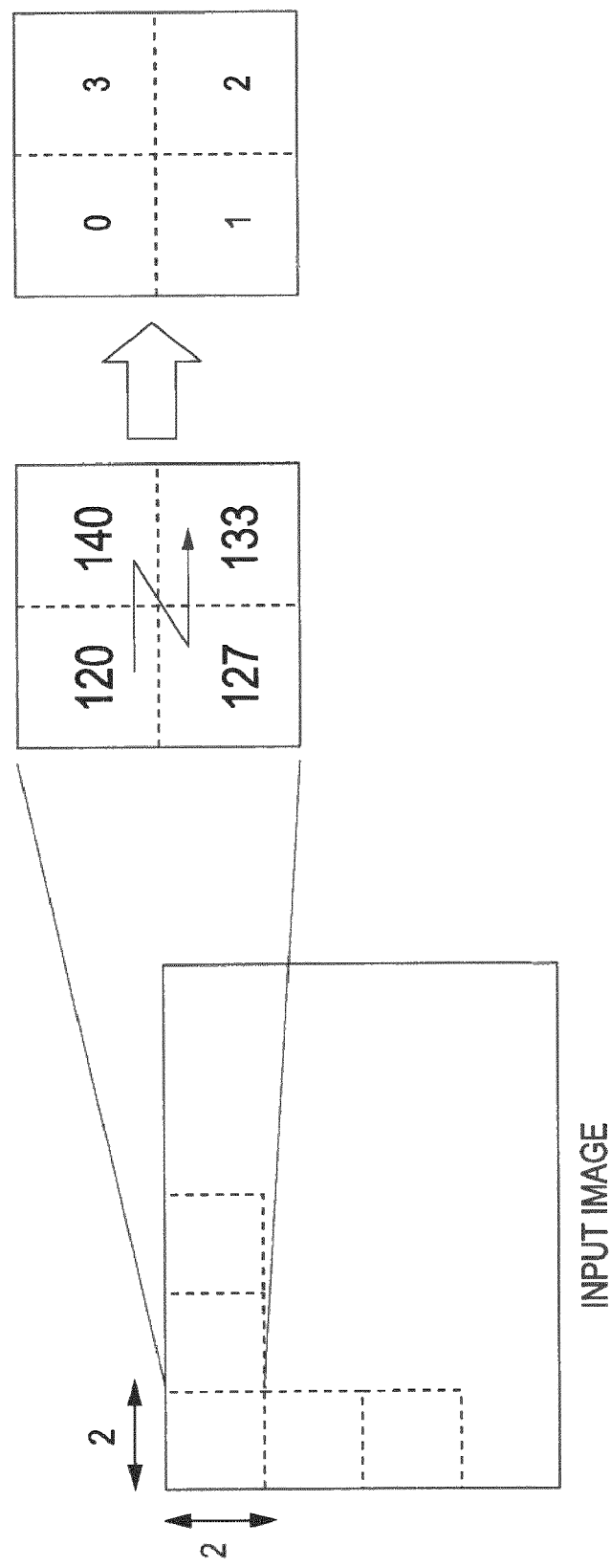
FIG. 4 is a diagram showing adaptive dynamic range coding.

The principle of ADRC encoding will now be described with reference to FIG. 4. Each screen of an input image is divided into blocks of n by n pixels. In FIG. 4, a screen is divided into blocks each having a size of two by two pixels. First, in each of the blocks, maximum and minimum values are extracted. Pixel values range from 0 to 255. For example, an upper left block of the screen has pixel values of 120, 140, 127, and 133 in the order of upper left, upper right, lower left, and lower right. The maximum value is 140 and the minimum value is 120.

Then, a dynamic range DR of the block is determined using the following equation:

$$DR = \text{maximum value} - \text{minimum value} + 1 \quad (1)$$

In the example shown in FIG. 4, the dynamic range DR is equal to 21, as given by the following equation:

$$140 - 120 + 1 = 21 \quad (2)$$

Figure 5:
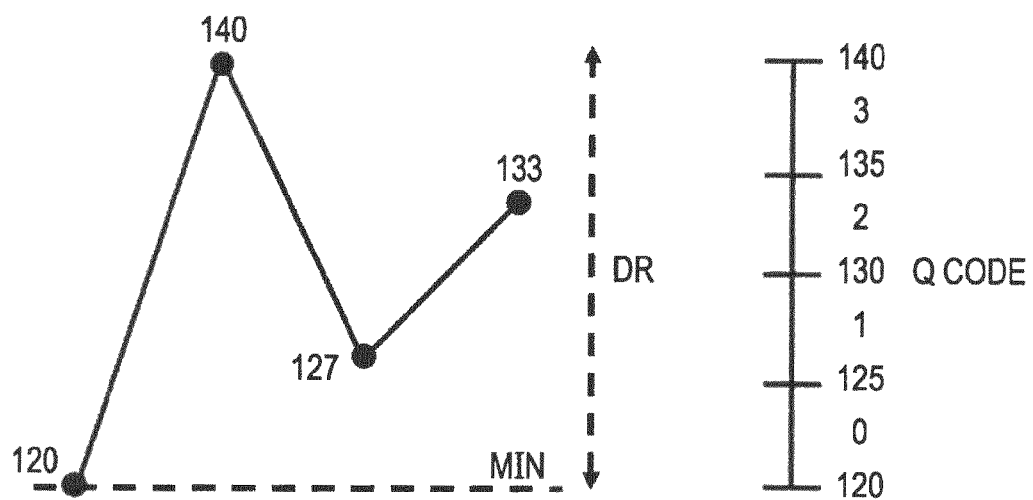
FIG. 5 is a diagram showing re-quantization codes.

Then, in the case of N-bit ADRC, a dynamic range is divided into $2^N$ parts. The value N may be a number specified by a user. In an example shown in FIG. 5, a dynamic range DR ranging from 120 to 140 is divided into four sections of 120 to 125, 125 to 130, 130 to 135, and 135 to 140. The individual sections are assigned re-quantization codes (Q codes) of 0, 1, 2, and 3.

The pixel value of 120 is a value ranging from 120 to 125 and is assigned a re-quantization code of 0. The pixel value of 140 is a value ranging from 135 to 140 and is assigned a re-quantization code of 3. The pixel value of 127 is a value ranging from 125 to 130 and is assigned a re-quantization code of 1. The pixel value of 133 is a value ranging from 130 to 135 and is assigned a re-quantization code of 2. Accordingly, the upper left block of the screen shown in FIG. 4 is represented by re-quantization codes indicated by a block shown at the right end of FIG. 4. The process described above is performed for all blocks of the screen to construct a re-quantization code screen in which the screen is represented by re-quantization codes.

The encoding unit 22 encodes the image signal using ADRC to compute a minimum value, dynamic range, and re-quantization codes of each block in the manner described above.

Referring back to FIG. 3, after the encoding process is performed in step S2 in the manner described above, in step S3, the storage unit 23 stores the ADRC-encoded image signal. Specifically, the minimum values, the dynamic ranges, and the re-quantization codes are stored. The amount of data of the ADRC-encoded image signal can be reduced compared with that when the image signal is stored as it is.

By storing not only re-quantization codes but also dynamic ranges, an image can be retrieved using the dynamic ranges, which will be described below.

Figure 6:
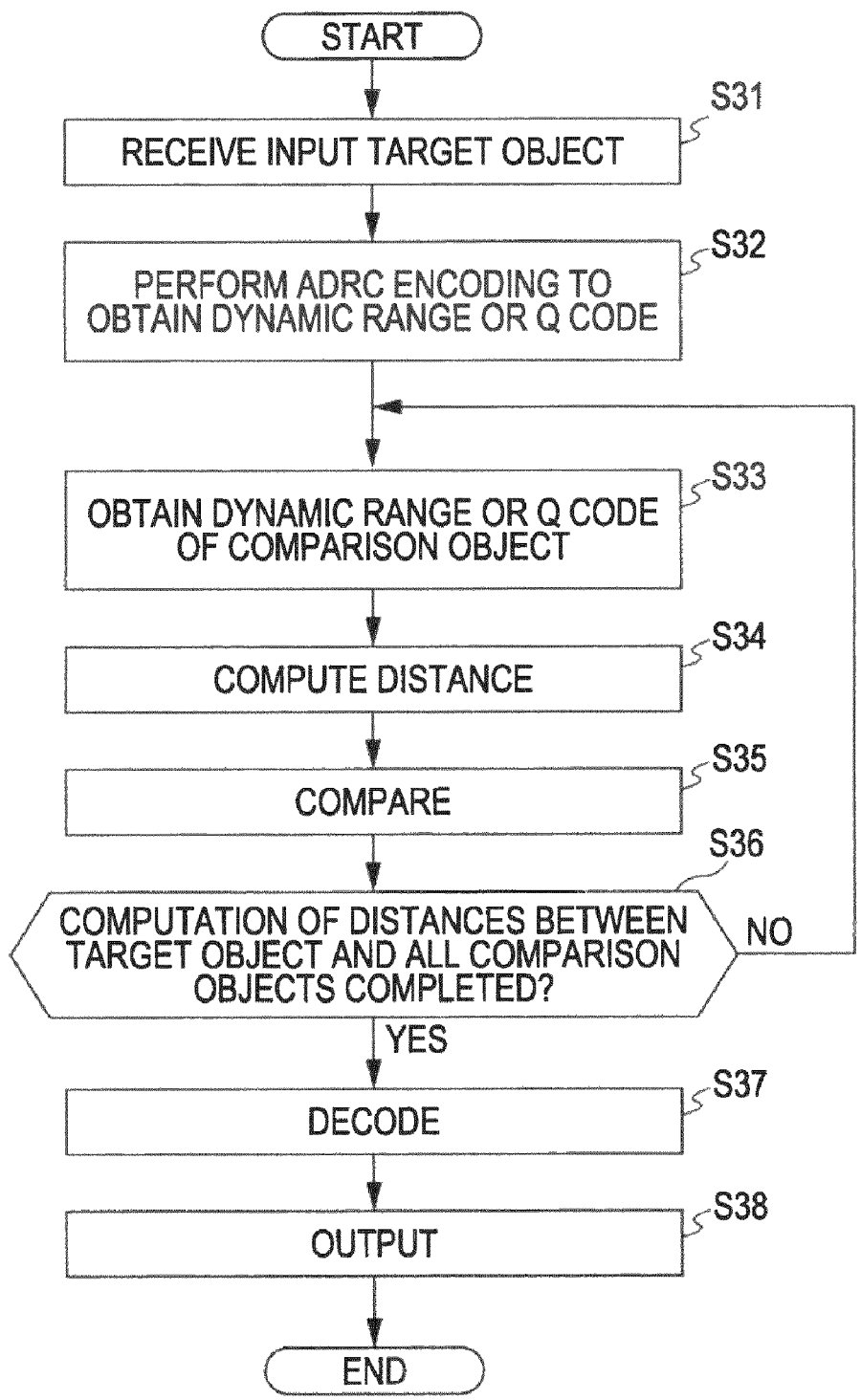
FIG. 6 is a flowchart showing a retrieval process.

Next, a retrieval process executed by the information retrieval apparatus 12 will be described with reference to a flowchart of FIG. 6.

In step S31, the input unit 21 receives an input target object to be retrieved. Specifically, an image signal is input as a target object to be retrieved. In step S32, the encoding unit 22 encodes the input target object using ADRC, and obtains minimum values, dynamic ranges, and re-quantization codes. Alternatively, only dynamic ranges or re-quantization codes may be obtained. Which of the dynamic range and the re-quantization code is obtained is determined on the basis of which of them is to be used in the computation of a distance in step S34, described below. In a case where both the dynamic range and the re-quantization code are to be used, both are obtained.

In a case where the target object has been ADRC-encoded and stored in the storage unit 23, the target object is read from the storage unit 23 and is obtained.

In step S33, the reading unit 41 obtains dynamic ranges or re-quantization codes of a comparison object. Specifically, one image signal is read as a comparison object stored in the storage unit 23. As in step S32, which of the dynamic range and the re-quantization code is read is determined on the basis of which of them is to be used in the computation of a distance in subsequent step S34. In a case where both the dynamic range and the re-quantization code are to be used, both are read.

An image used as a comparison object may be an image within a range determined based on a condition specified by a user, such as a genre or a registration date. Alternatively, all images stored in the storage unit 23 may be used as comparison objects.

In step S34, the distance computation unit 42 computes a distance. Specifically, the distance between the dynamic ranges or re-quantization codes of the target object obtained in step S32 and the dynamic ranges or re-quantization codes of the comparison object read in step S33 is computed.

Figure 7:
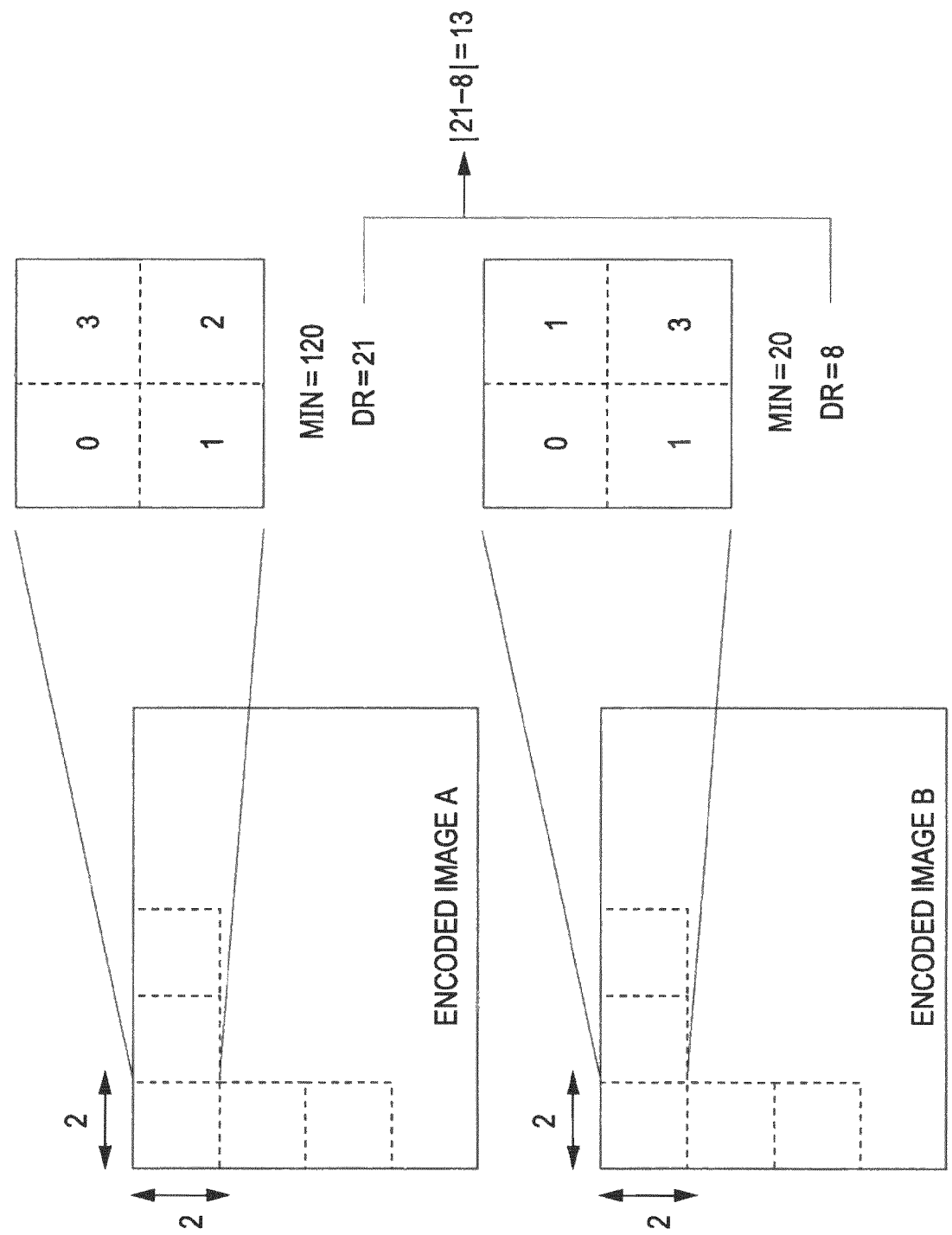
FIG. 7 is a diagram showing a comparison between encoded images using the absolute value of a difference between dynamic ranges.

For example, as shown in FIG. 7, it is assumed that in an upper left block on a screen of an encoded image A as a target object to be retrieved, the minimum value (MIN) of pixel values is 20, the dynamic range (DR) of the pixel values is 21, and the re-quantization codes of the four pixels are 0, 3, 1, and 2 in the order of upper left, upper right, lower left, and lower right.

It is further assumed that in a corresponding, upper left block on a screen of an encoded image B as a comparison object to be compared, the minimum value (MIN) of pixel values is 20, the dynamic range (DR) of the pixel values is 8, and the re-quantization codes of the four pixels are 0, 1, 1, and 3 in the order of upper left, upper right, lower left, and lower right.

In a case where the distance is computed using the dynamic range, the distance is given by the absolute value of a difference between dynamic ranges. In the example shown in FIG. 7, the dynamic range (DR) of the encoded image A as a target object to be retrieved is 21 and the dynamic range (DR) of the encoded image B as a comparison object is 8. The absolute value of the difference therebetween is thus equal to 13, as given by the following equation:

$$|21-8|=13 \qquad (3)$$

The determined value of 13 represents the distance between a block of the target object and a corresponding block of the comparison object.

The sum of the distances between all blocks of the target object and corresponding blocks of the comparison object is computed and is regarded as the distance between the target object and the comparison object. The smaller the sum is, the more similar the images are.

Instead of the absolute value of a difference, the squared value of a difference may be used.

The use of dynamic ranges involves only block-by-block integer operation, resulting in high-speed computation and high-speed retrieval.

Figure 8:
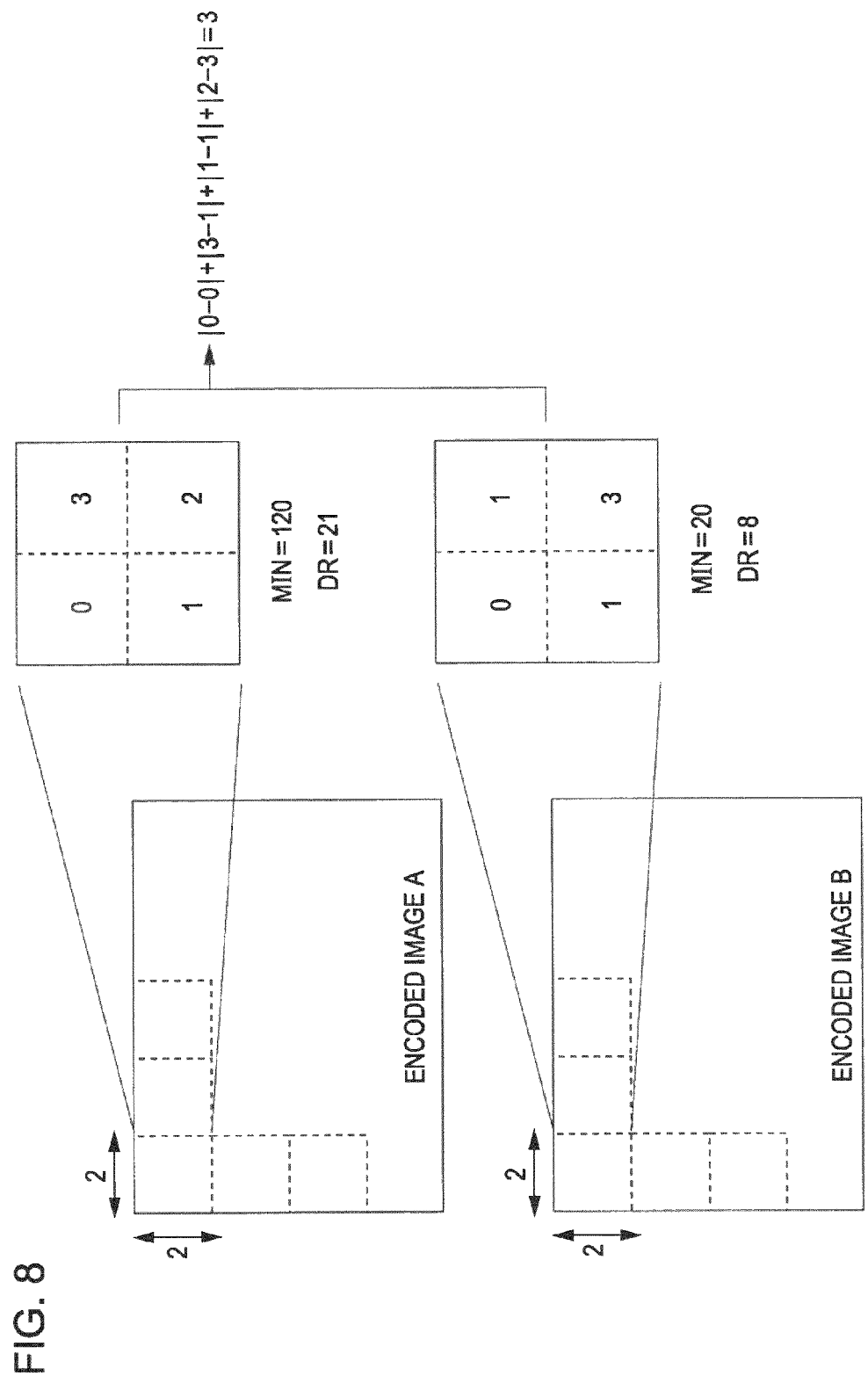
FIG. 8 is a diagram showing a comparison between encoded images using the absolute value of a difference between re-quantization codes.

Two methods exist to compute a distance using re-quantization codes. A first method is a method in which the absolute value of a difference between re-quantization codes is regarded as a distance. As shown in FIG. 8, in an upper left block of an encoded image A as a target object to be retrieved, the re-quantization codes of four pixels are 0, 3, 1, and 2 in the order of upper left, upper right, lower left, and lower right, and, in an upper left block of an encoded image B as a comparison object, the re-quantization codes of four pixels are 0, 1, 1, and 3 in the order of upper left, upper right, lower left, and lower right. The absolute value of the difference between the re-quantization codes of the corresponding blocks is thus equal to 3, as given by the following equation:

$$|0-0|+|3-1|+|1-1|+|2-3|=3 \qquad (4)$$

Also in this case, the sum of distances between all blocks of the target object and corresponding blocks of the comparison object is computed, and is regarded as the distance between the target object and the comparison object. The smaller the sum is, the more similar the images are.

Also in this case, instead of the absolute value of a difference, the squared value of a difference may be used.

Figure 9:
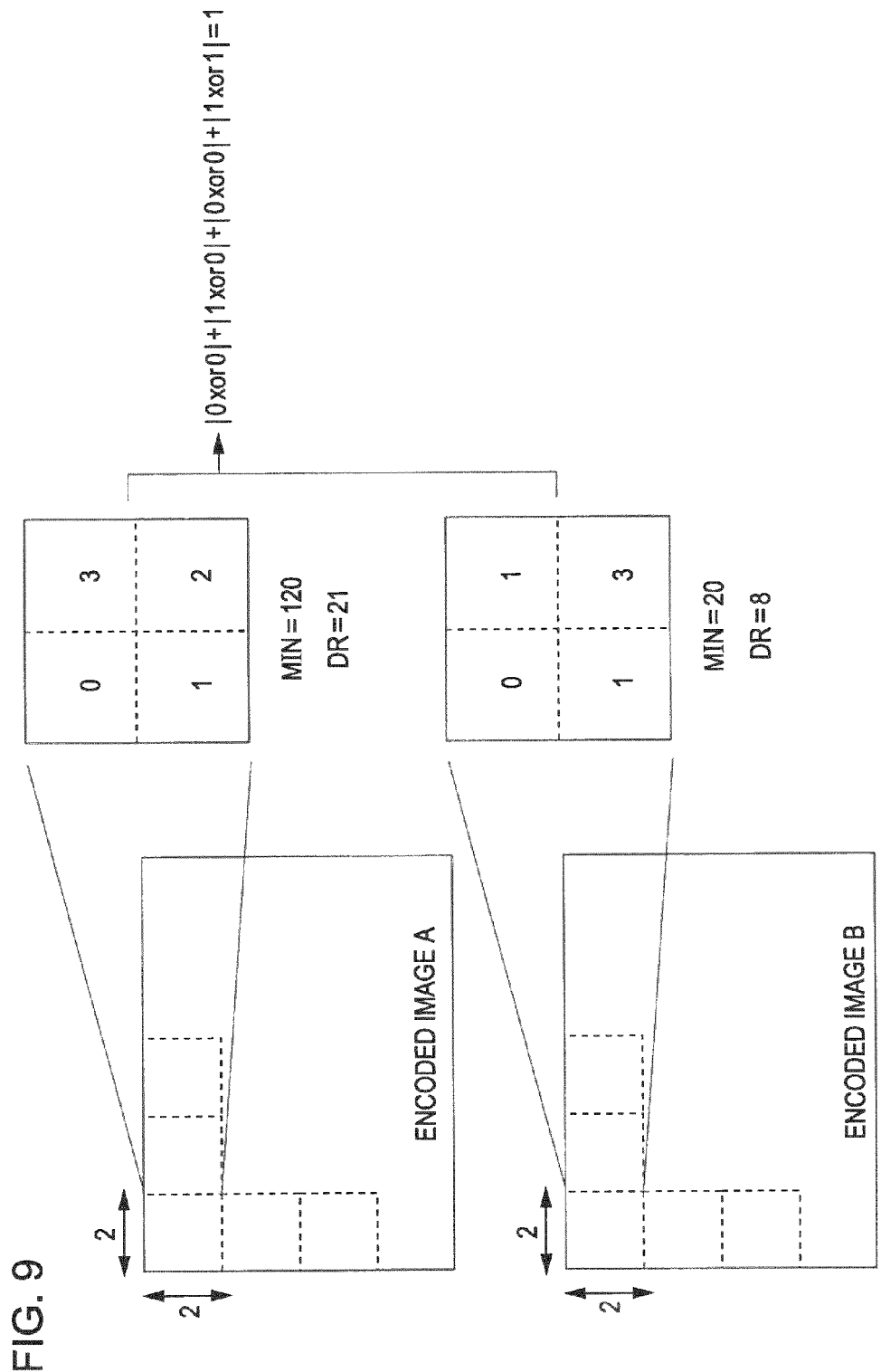
FIG. 9 is a diagram showing a comparison between encoded images using exclusive ORs of MSBs of re-quantization codes.

A second method of computing a distance using re-quantization codes is a method in which, as shown in FIG. 9, exclusive ORs of the most significant bits (MSBs) of binary re-quantization codes are calculated and the sum of the exclusive ORs is regarded as a distance. Values 0, 1, 2, and 3 in decimal notation equal values 00, 01, 10, and 11 in binary notation, respectively, and the MSBs thereof are 0, 0, 1, and 1, respectively. In this case, the distance between the upper left block of the target object and the upper left block of the comparison object is equal to 1, as given by the following equation:

$$(0 \text{ xor } 0)+(1 \text{ xor } 0)+(0 \text{ xor } 0)+(1 \text{ xor } 1)=1 \qquad (5)$$

where xor denotes the exclusive OR operation.

Also in this case, the sum of distances between all blocks of the target object and corresponding blocks of the comparison object is computed and is regarded as the distance between the target object and the comparison object. The smaller the sum is, the more similar the images are.

The use of re-quantization codes involves only integer operation or logical operation of the re-quantization codes, resulting in high-speed computation and high-speed retrieval.

Regardless of whether the distance is computed using the dynamic range or the re-quantization code, a position of the screen may be shifted in a plane, and a smaller value may be selected and regarded as a distance between corresponding blocks.

The distance may also be computed using both the dynamic range and the re-quantization code. In this case, distances are computed using dynamic ranges and re-quantization codes in the manner described above, and a value obtained by weighting the distances with a predetermined factor and adding the weighted distances is regarded as the final distance. By using both the dynamic range and the re-quantization code, higher precision retrieval can be achieved.

Referring back to FIG. 6, after the distance is computed in the manner described above, in step S35, the comparison unit 43 compares the computed distances. Specifically, the previously computed distances and the currently computed distance are compared, and a desired number of comparison objects specified by the user in order starting from that having the shortest distance are selected as images similar to the target object.

In step S36, the distance computation unit 42 determines whether or not the distance between the target object and all comparison objects has been computed. If there is an image to be compared with the target image received in step S31, the process returns to step S33. Then, a new comparison object is selected, and dynamic ranges or re-quantization codes of the selected comparison object are obtained. Then, in step S34, the distance between the target object and the new comparison object is computed. In step S35, the currently computed distance is compared with the previous distances, and a comparison object having a shorter distance is selected. In step S36, this process is repeated until it is determined that the distance between the target object and all comparison objects has been computed.

If the distance between the target object and all comparison objects has been computed, in step S37, the decoding unit 44 decodes the comparison objects having a short distance, which are selected in the processing of step S35, using a method corresponding to the encoding process used in the encoding unit 22. The target object is also decoded. In step S38, the output unit 45 outputs the comparison objects and target object decoded in step S37. Therefore, the image of the input target object and the images of the comparison objects similar thereto are displayed. A user can view the output images of the comparison objects and can specify and select one of the images that is the most similar to the target object.

Figure 10:
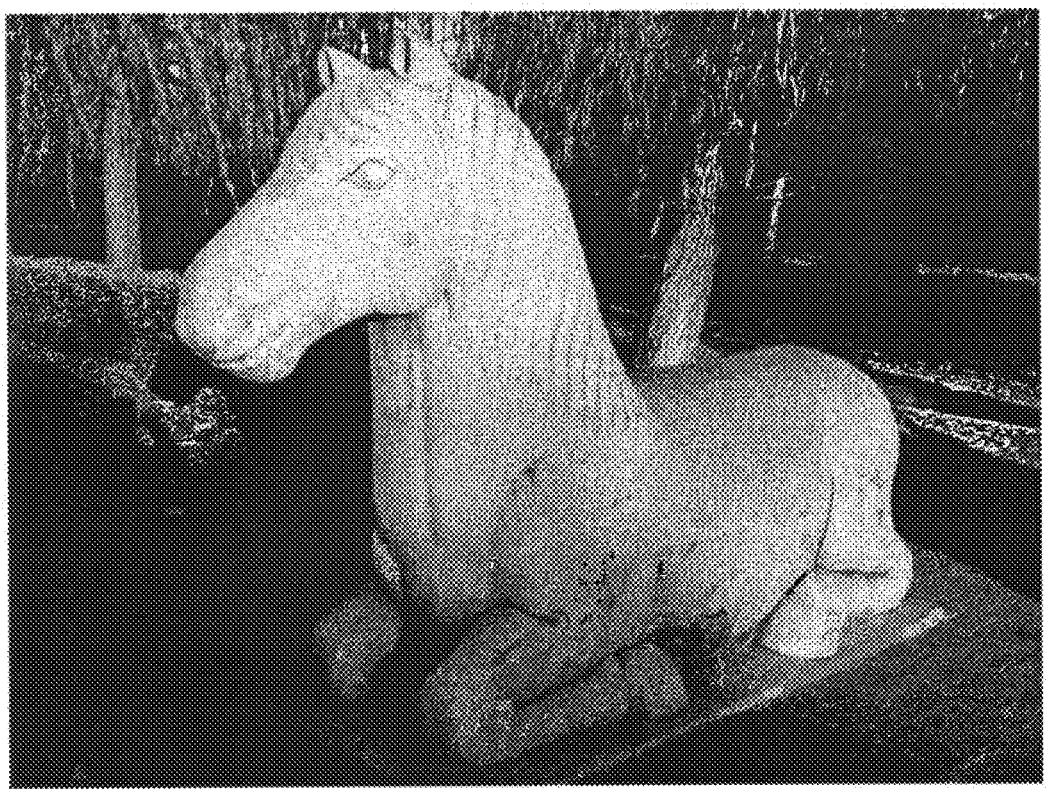
FIG. 10 is a diagram showing an original image before encoding.
Figure 11:
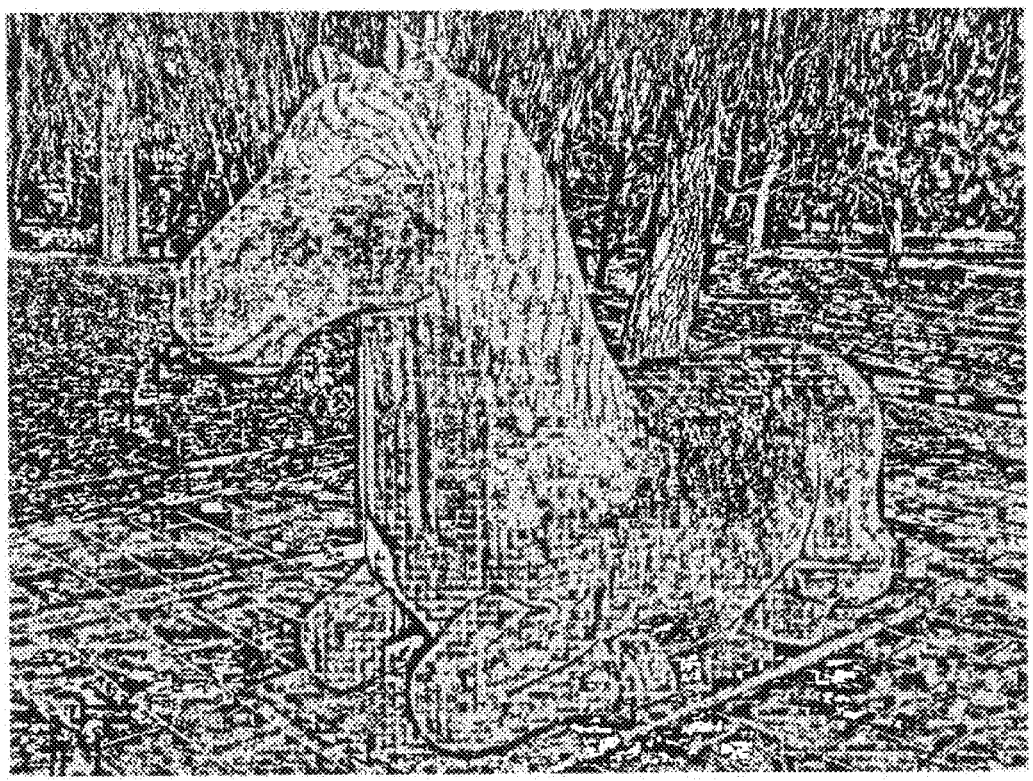
FIG. 11 is a diagram showing a representation in which the image shown in FIG. 10 is represented by MSBs of re-quantization codes.
Figure 12:
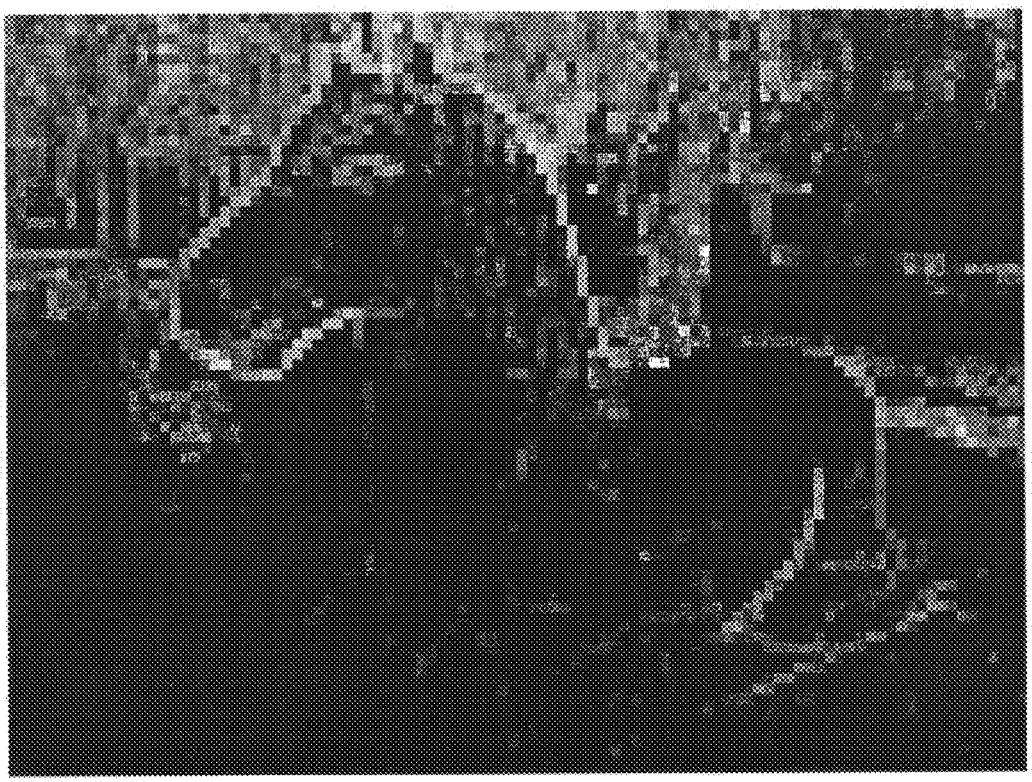
FIG. 12 is a diagram showing a dynamic range representation of the image shown in FIG. 10.

An image shown in FIG. 10 is encoded using ADRC in units of blocks each having a size of eight by eight pixels, and the ADRC-encoded image is represented such that a pixel having a re-quantization code whose MSB is 1 is represented by white and a pixel having a re-quantization code whose MSB is 0 is represented by black. An image represented in this manner is shown in FIG. 11. FIG. 12 shows an image in which the image shown in FIG. 10 is also encoded using ADRC and is represented such that dynamic range values of blocks each having a size of eight by eight pixels are represented by pixel values.

Note that MSBs of Q codes and dynamic range values are not influenced by the value N of N-bit ADRC. Therefore, the image shown in FIG. 11 or 12 can be obtained from the image shown in FIG. 10 regardless of the value N.

As can be seen, FIG. 11 represents a feature of texture of the image and FIG. 12 represents a feature of edges of the image. What feature is represented is not necessarily uniquely determined because it also depends upon the feature of the original image and the block size. However, it is to be understood that an ADRC-encoded image shows some feature of the original image. Therefore, an encoded image can be reliably retrieved.

Accordingly, a feature value obtained by encoding an image using ADRC in order to compress and record the image is used as it is to perform retrieval. Therefore, it is not necessary to perform processes such as partially decoding of an image that is encoded for feature extraction during retrieval. Thus, the amount of computation can be reduced during retrieval to ensure quick retrieval.

While the foregoing description has been given in the context of image retrieval, embodiments of the present invention may include retrieval of audio information and other information.

The series of processes described above can be executed by hardware or software. When the series of processes is executed by software, a program constituting the software may be installed from a program recording medium into a computer incorporated in dedicated hardware or into a device capable of executing various functions by installing therein various programs, such as a general-purpose computer.

Examples of program recording media storing a computer-executable program installed in a computer may include a magnetic disc (including a flexible disc), an optical disc (including a compact disc-read only memory (CD-ROM), a digital versatile disc (DVD)), and a magneto-optical disc), removable media, which are packaged media such as a semiconductor memory, and media having a program temporarily or permanently stored therein, such as a ROM and a hard disk. The program may be stored on a program recording medium through an interface such as a router or a modem using a wired or wireless communication medium such as a local area network, the Internet, or digital satellite broadcasting, as necessary.

In this specification, steps defining a program may include processes that are executed sequentially in the order described herein, and also include processes that are executed in parallel or individually, not necessarily sequentially.

The term "system", as used herein, refers to an entire apparatus including a plurality of apparatuses.

Embodiments of the present invention are not limited to the embodiment described above, and a variety of modifications may be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information retrieval apparatus comprising:
   an obtaining unit configured to obtain dynamic ranges and re-quantization codes of a target object to be retrieved and dynamic ranges and re-quantization codes of each of a plurality of comparison objects to be compared with the target object, the dynamic ranges and re-quantization codes of the target object and the dynamic ranges and re-quantization codes of the plurality of comparison objects being obtained as a result of adaptive dynamic range coding;
   a distance computation unit configured to compute distances between a same block of the target object and a corresponding block of each of the plurality of comparison objects using the obtained dynamic range and re-quantization codes of the same block of the target object and the obtained dynamic range and re-quantization codes of the corresponding block of the respective one of the plurality of comparison objects; and
   a comparison unit configured to compare distances between the target object and each of the plurality of comparison objects to select one of the comparison objects having a minimum distance.

2. The information retrieval apparatus according to claim 1, further comprising:
   a decoding unit configured to decode the selected comparison object; and
   an output unit configured to output the decoded comparison object.

3. The information retrieval apparatus according to claim 1, wherein
   the distance computation unit computes the distances between the target object and each of the plurality of comparison objects by calculating a sum of absolute values of differences between the dynamic ranges and dynamic ranges of each of the plurality of comparison objects and calculating a sum of absolute values of differences between the re-quantization codes of the target object and re-quantization codes of each of the plurality of comparison objects, or
   calculating a sum of squared values of differences between the dynamic ranges and dynamic ranges of each of the plurality of comparison objects and by calculating a sum of squared values of differences between the re-quantization codes of the target object re-quantization codes of each of the plurality of comparison objects.

4. The information retrieval apparatus according to claim 1, wherein the distance computation unit computes the distances between the target object and each of the plurality of comparison objects by calculating a sum of exclusive ORs of most significant bits of the re-quantization codes of the target object and a sum of exclusive ORs of most significant bits of re-quantization codes of each of the plurality of comparison objects.

5. An information retrieval method comprising the steps of:
obtaining, using an obtaining unit, dynamic ranges and re-quantization codes of a target object to be retrieved and dynamic ranges and re-quantization codes of each of a plurality of comparison objects to be compared with the target object, the dynamic ranges and re-quantization codes of the target object and the dynamic ranges and re-quantization codes of the plurality of comparison objects being obtained as a result of adaptive dynamic range coding;
computing, using a distance computation unit, distances between a same block of the target object and a corresponding block of each of the plurality of comparison objects using the obtained dynamic range and re-quantization codes of the same block of the target object and the obtained dynamic range and re-quantization codes of the corresponding block of the respective one of the plurality of comparison objects; and
comparing, using a comparison unit, distances between the target object and each of the plurality of comparison objects to select one of the comparison objects having a minimum distance.

6. A non-transitory computer-readable storage medium having a computer-readable program stored therein that when executed by a computer causes the computer to execute a process, the process comprising the steps of:
obtaining dynamic ranges and re-quantization codes of a target object to be retrieved and dynamic ranges and re-quantization codes of each of a plurality of comparison objects to be compared with the target object, the dynamic ranges or re-quantization codes of the target object and the dynamic ranges and re-quantization codes of the plurality of comparison objects being obtained as a result of adaptive dynamic range coding;
computing distances between a same block of the target object and a corresponding block of each of the plurality of comparison objects using the obtained dynamic range and re-quantization codes of the same block of the target object and the obtained dynamic range and re-quantization codes of the corresponding block of the respective one of the plurality of comparison objects; and
comparing distances between the target object and each of the plurality of comparison objects to select one of the comparison objects having a minimum distance.

7. An information encoding apparatus comprising:
an input unit configured to receive an input target object to be retrieved and an input comparison object to be compared with the input target object during retrieval;
an encoding unit configured to encode the input comparison object using adaptive dynamic range coding; and
a storage unit configured to store comparison data including at least re-quantization codes and dynamic ranges of the comparison object obtained as a result of the adaptive dynamic range coding, the re-quantization codes and dynamic ranges of the comparison object being read and used to compute a distance between the comparison object and the input target object.

8. An information encoding method comprising the steps of:
receiving, using an input unit, an input target object to be retrieved and an input comparison object to be compared with the input target object during retrieval;
encoding, using an encoding unit, the input comparison object using adaptive dynamic range coding; and
storing, using a storage unit, comparison data including at least re-quantization codes and dynamic ranges of the comparison object obtained as a result of the adaptive dynamic range coding, the re-quantization codes and dynamic ranges of the comparison object being used to compute a distance between the comparison object and the input target object.

9. A non-transitory computer-readable storage medium having a computer-readable program stored therein that when executed by a computer causes the computer to execute a process, the process comprising the steps of:
receiving an input target object to be retrieved and an input comparison object to be compared with the input target object during retrieval;
encoding the input comparison object using adaptive dynamic range coding; and
storing comparison data including at least re-quantization codes and dynamic ranges of the comparison object obtained as a result of the adaptive dynamic range coding, the re-quantization codes and dynamic ranges of the comparison object being used to compute a distance between the comparison object and the input target object.

10. An information retrieval system comprising:
an input unit configured to receive input information;
an encoding unit configured to encode the input information using adaptive dynamic range coding;
an obtaining unit configured to obtain dynamic ranges and re-quantization codes of a target object to be retrieved and dynamic ranges and re-quantization codes of each of a plurality of comparison objects to be compared with the target object, the dynamic ranges and re-quantization codes of the target object and the dynamic ranges and re-quantization codes of the plurality of comparison objects being obtained as a result of the adaptive dynamic range coding;
a distance computation unit configured to compute distances between a same block of the target object and a corresponding block of each of the plurality of comparison objects using the obtained dynamic range and re-quantization codes of the same block of the target object and the obtained dynamic range and re-quantization codes of the corresponding block of the respective one of the plurality of comparison objects; and
a comparison unit configured to compare distances between the target object and each of the plurality of comparison objects to select one of the comparison objects having a minimum distance.

11. An information retrieval method comprising the steps of:
receiving, using an input unit, input information;
encoding, using an encoding unit, the input information using adaptive dynamic range coding;
obtaining, using an obtaining unit, dynamic ranges and re-quantization codes of a target object to be retrieved and dynamic ranges and re-quantization codes of each of a plurality of comparison objects to be compared with the target object, the dynamic ranges and re-quantization codes of the target object and the dynamic ranges or re-quantization codes of the plurality of comparison objects being obtained as a result of the adaptive dynamic range coding;

computing, using a distance computation unit, distances between a same block of the target object and a corresponding block of each of the plurality of comparison objects using the obtained dynamic range and re-quantization codes of the same block of the target object and the obtained dynamic range and re-quantization codes of the corresponding block of the respective one of the plurality of comparison objects; and comparing, using a comparison unit, distances between the target object and each of the plurality of comparison objects to select one of the comparison objects having a minimum distance.

12. A non-transitory computer-readable storage medium having a computer-readable program stored therein that when executed by a computer causes the computer to execute a process, the process comprising the steps of:

receiving input information;

encoding the input information using adaptive dynamic range coding;

obtaining dynamic ranges and re-quantization codes of a target object to be retrieved and dynamic ranges and re-quantization codes of each of a plurality of comparison objects to be compared with the target object, the dynamic ranges and re-quantization codes of the target object and the dynamic ranges and re-quantization codes of the plurality of comparison objects being obtained as a result of the adaptive dynamic range coding;

computing distances between a same block of the target object and a corresponding block of each of the plurality of comparison objects using the obtained dynamic range and re-quantization codes of the same block of the target object and the obtained dynamic range and re-quantization codes of the corresponding block of the respective one of the plurality of comparison objects; and comparing distances between the target object and each of the plurality of comparison objects to select one of the comparison objects having a minimum distance.

13. The information retrieval apparatus according to claim 1, wherein
the distance computation unit computes the distances between all of the blocks of the target object and all of the corresponding blocks of each of the plurality of comparison objects.

14. The information retrieval apparatus according to claim 13, wherein
the distance between the target object and each one of the plurality of comparison objects is the sum of the distances between all of the blocks of the target object and all of the blocks of the respective one of the plurality of comparison objects.

15. The information retrieval apparatus according to claim 1, wherein
the comparison unit selects a predetermined number of comparison objects, specified by a user, as objects similar to the target object, including the comparison object having the minimum distance from the target object.

* * * * *